(12) United States Patent
Taubmann et al.

(10) Patent No.: US 10,392,845 B2
(45) Date of Patent: Aug. 27, 2019

(54) METHOD FOR PRODUCING A CATCH FOR A WINDOW LIFTING DEVICE

(71) Applicant: Brose Fahrzeugteile GmbH & Co. Kommanditgesellschaft, Bamberg, Bamberg (DE)

(72) Inventors: Udo Taubmann, Bad Rodach (DE); Christian Dallos, Hallstadt (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 263 days.

(21) Appl. No.: 15/124,000

(22) PCT Filed: Mar. 10, 2015

(86) PCT No.: PCT/EP2015/054875
§ 371 (c)(1),
(2) Date: Sep. 6, 2016

(87) PCT Pub. No.: WO2015/135892
PCT Pub. Date: Sep. 17, 2015

(65) Prior Publication Data
US 2017/0016258 A1    Jan. 19, 2017

(30) Foreign Application Priority Data
Mar. 10, 2014  (DE) .................. 10 2014 204 361

(51) Int. Cl.
*B60J 1/16*      (2006.01)
*E05D 15/16*   (2006.01)
(Continued)

(52) U.S. Cl.
CPC ............ *E05D 15/165* (2013.01); *B29C 45/16* (2013.01); *E05F 5/003* (2013.01); *E05F 5/022* (2013.01);
(Continued)

(58) Field of Classification Search
CPC .......... B29C 45/16; B29C 45/00; E05F 11/40; E05F 11/52; E05Y 2800/45; E05Y 2800/46; E05Y 2800/68; E95Y 2201/612
(Continued)

(56) References Cited

U.S. PATENT DOCUMENTS 6,170,197 B1 *  1/2001  Tyves ................... E05F 11/385
                                                              49/358
6,450,393 B1 *  9/2002  Doumanidis ........... B23P 15/00
                                                              228/110.1
(Continued)

FOREIGN PATENT DOCUMENTS

CN        1451562 A       10/2003
DE    42 18 425 A1       12/1993
(Continued)

OTHER PUBLICATIONS

Chinese Office action issued in corresponding CN Application No. 201580013461.5 dated Jul. 24, 2017, 8 pages.
(Continued)

*Primary Examiner* — Jerry E Redman
(74) *Attorney, Agent, or Firm* — Lewis Roca Rothgerber Christie LLP

(57) ABSTRACT

A method for producing a carrier element for a window lifting device in which adjustment of a glass is performed by means of a traction means, the carrier element being displaceable along a guide rail of the window lifting device and being connected to the traction means, is provided. The completed carrier element has at least two interconnected bodies which are produced from dissimilar materials having dissimilar melting points, and the carrier element having the at least two bodies is produced by a multicomponent injection-molding method. In the production of the carrier element by the multicomponent injection-molding method a body from a material melting at a lower temperature is
(Continued)

molded before a body from a material melting at a higher temperature, and the body from the material melting at a higher temperature is molded to the body from the material melting at a lower temperature.

11 Claims, 7 Drawing Sheets

(51) Int. Cl.
    *E05F 11/38*     (2006.01)
    *B29C 45/16*     (2006.01)
    *E05F 5/00*     (2017.01)
    *E05F 5/02*     (2006.01)
    *E05F 11/48*     (2006.01)
    *B29L 31/30*     (2006.01)

(52) U.S. Cl.
    CPC ..... *E05F 11/382* (2013.01); *B29L 2031/3052* (2013.01); *E05F 11/483* (2013.01); *E05Y 2201/212* (2013.01); *E05Y 2201/612* (2013.01); *E05Y 2800/45* (2013.01); *E05Y 2800/46* (2013.01); *E05Y 2800/68* (2013.01); *E05Y 2900/55* (2013.01)

(58) Field of Classification Search
    USPC .................................................. 49/374, 375
    See application file for complete search history.

(56) References Cited

U.S. PATENT DOCUMENTS

| | | | |
|---|---|---|---|
| 8,209,908 B2* | 7/2012 | Mori | E05F 11/385 |
| | | | 49/348 |
| 8,650,800 B2* | 2/2014 | Anderson | E05F 11/445 |
| | | | 49/351 |
| 2002/0020945 A1* | 2/2002 | Cho | B29C 64/165 |
| | | | 264/460 |
| 2003/0196384 A1 | 10/2003 | Kang | |
| 2004/0187391 A1* | 9/2004 | Fenelon | E05F 11/385 |
| | | | 49/375 |
| 2005/0005770 A1* | 1/2005 | Dallas | B01D 53/02 |
| | | | 96/108 |
| 2006/0010776 A1 | 1/2006 | Jutzi | |
| 2008/0241455 A1* | 10/2008 | DiNello | B32B 3/26 |
| | | | 428/58 |
| 2010/0043297 A1* | 2/2010 | Barr | E05F 11/385 |
| | | | 49/375 |
| 2012/0247020 A1 | 10/2012 | Trevarrow | |
| 2013/0320576 A1* | 12/2013 | Ishii | B29B 17/02 |
| | | | 264/36.12 |
| 2013/0324324 A1* | 12/2013 | Ishii | A63B 45/00 |
| | | | 473/376 |
| 2014/0161298 A1* | 6/2014 | Russell-Clarke | C25D 1/02 |
| | | | 381/380 |

FOREIGN PATENT DOCUMENTS

| | | |
|---|---|---|
| DE | 100 27 877 A1 | 12/2001 |
| DE | 202 11 131 U1 | 9/2002 |
| DE | 20211131 U1 | 9/2002 |
| DE | 10 2004 031 804 B3 | 6/2005 |
| DE | 20 2005 002 333 U1 | 6/2006 |
| DE | 10 2007 054 004 A1 | 5/2009 |
| DE | 10 2009 011 120 A1 | 9/2010 |
| DE | 10 2010 031 332 A1 | 1/2012 |
| DE | 102010031332 A1 | 1/2012 |
| EP | 0 409 095 A1 | 1/1991 |
| EP | 0409095 A1 | 1/1991 |
| EP | 2 505 758 A2 | 3/2012 |
| EP | 2505758 A2 | 10/2012 |
| GB | 2468405 A | 9/2010 |
| JP | H08199901 A | 8/1996 |
| JP | 2001049949 A | 2/2001 |
| WO | WO 2006/024267 A1 | 3/2006 |
| WO | WO 2009/062560 A1 | 5/2009 |

OTHER PUBLICATIONS

Japanese Office action issued in corresponding application No. JP2016-556975 dated Nov. 14, 2017, 2 pages.
English Translation of Chinese Office action, Application No. 201580013461.5 dated Jul. 24, 2017 filed in an IDS on Sep. 29, 2017, 4 pages.

* cited by examiner

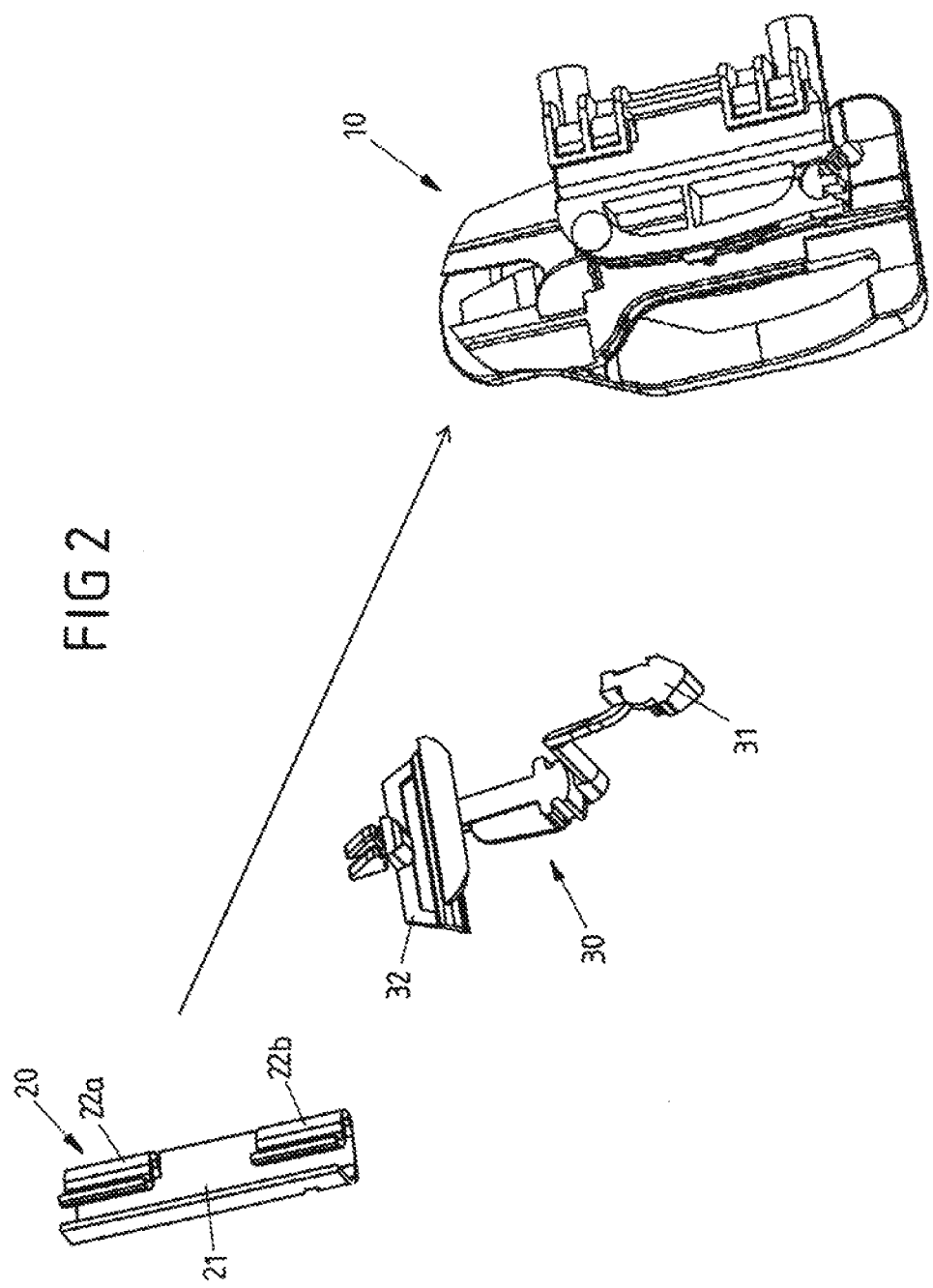

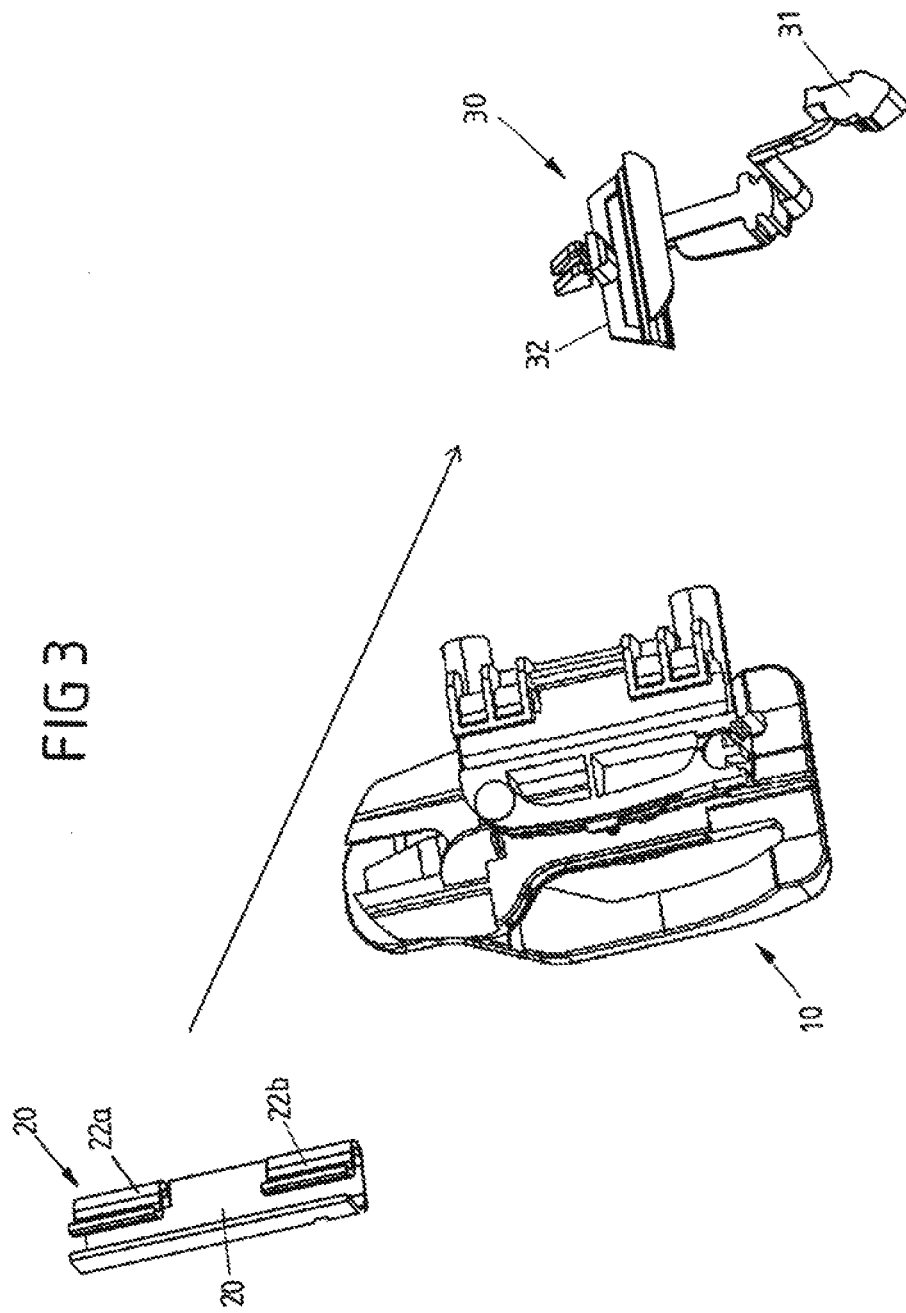

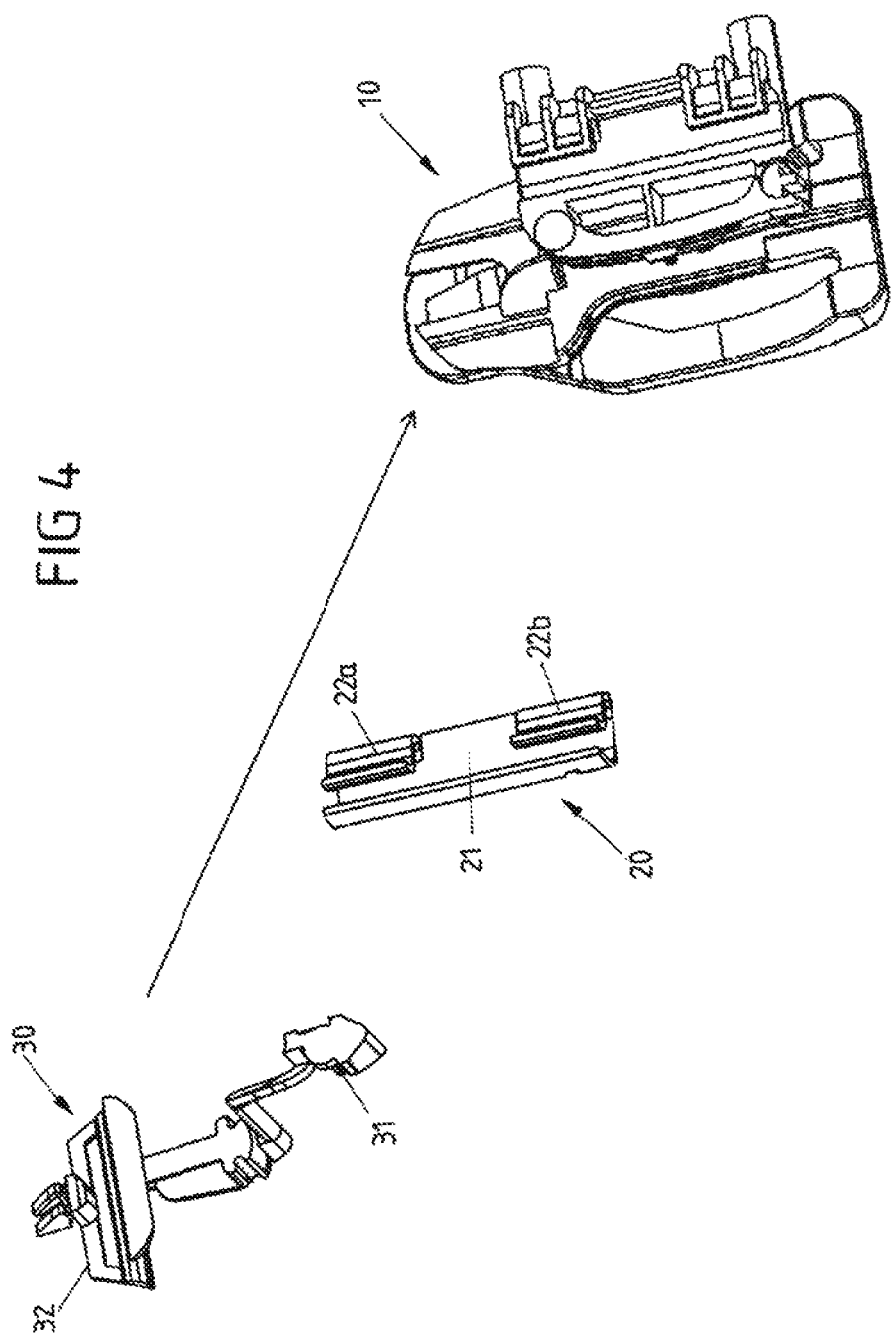

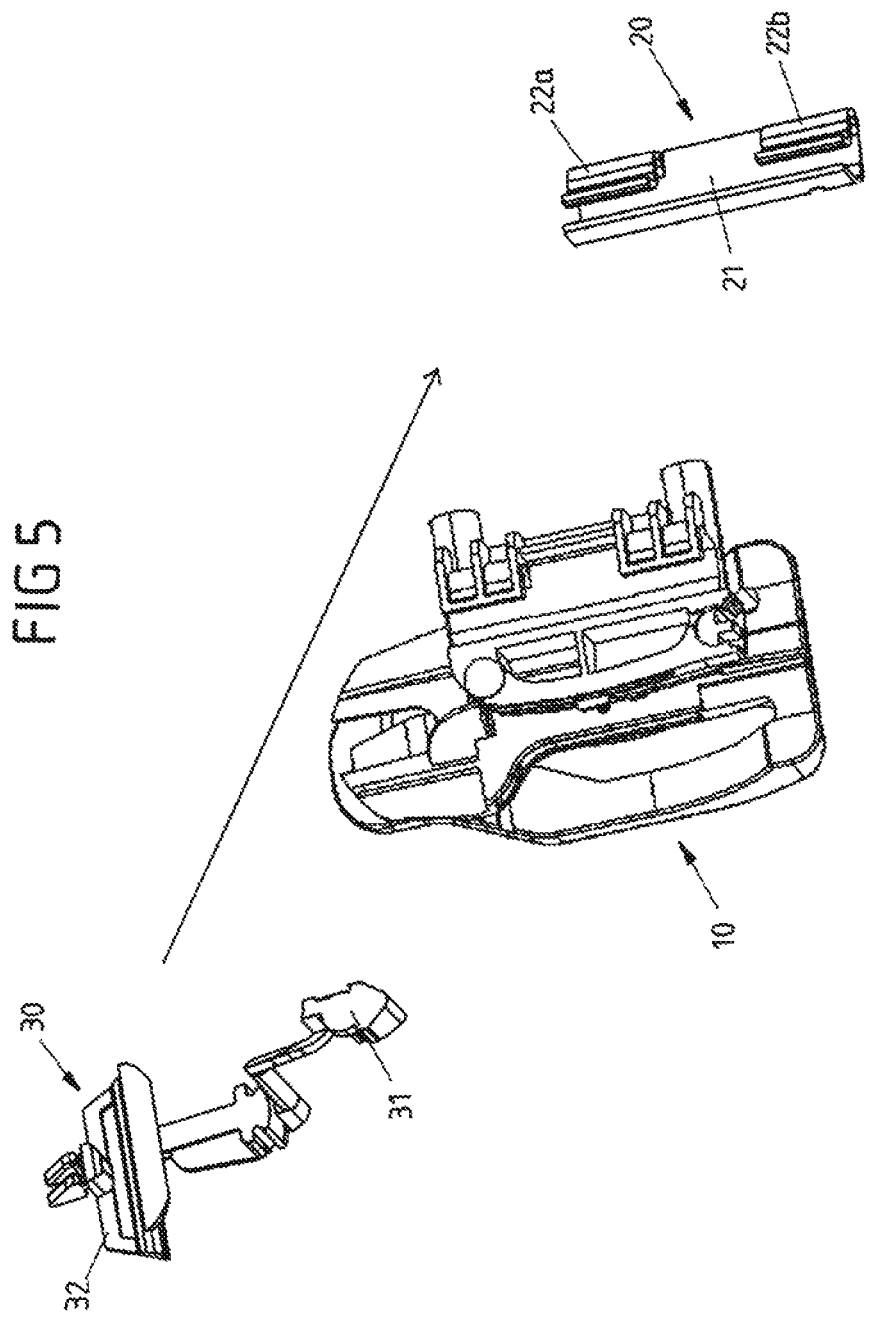

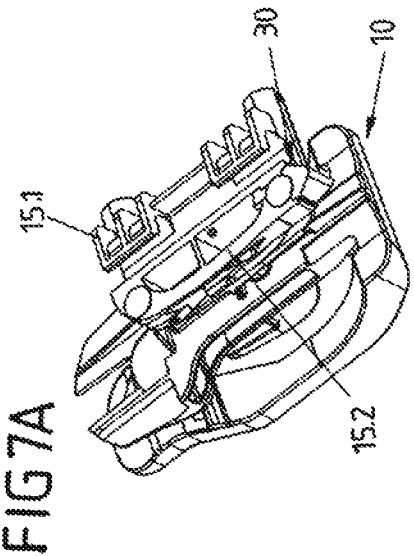
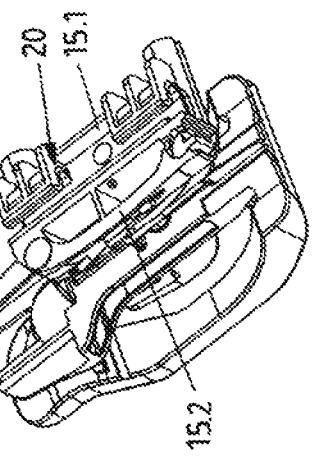
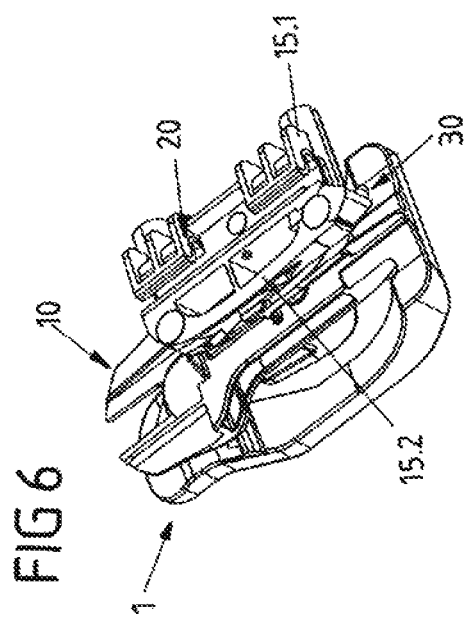
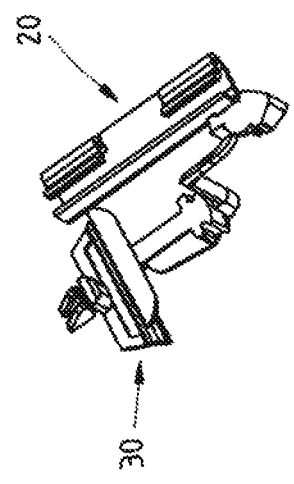

METHOD FOR PRODUCING A CATCH FOR A WINDOW LIFTING DEVICE

CROSS-REFERENCE TO A RELATED APPLICATION

This application is a National Phase Patent Application of International Patent Application Number PCT/EP2015/054875, filed on Mar. 10, 2015, which claims priority of German Patent Application Number 10 2014 204 361.1, filed on Mar. 10, 2014.

BACKGROUND

The present invention relates in particular to a carrier element for a window lifting device.

In particular in the case of motor-vehicle window lifting devices it is known for a carrier element which is connected to the glass which is to be adjusted to be displaceably guided along at least one guide rail of the window lifting device. The entrainment catch herein by way of a traction means, for example a cable pull, is coupled to a drive installation, so as to transmit a driving force and to adjust the carrier element along the guide rail. On account thereof, the glass is then displaced, for example lifted or lowered, along a predefined adjustment path.

A carrier element for a window lifting device of this type is usually produced from a plastics material or from a plurality of plastics materials. Herein it is known for the carrier element to be embodied in multiple parts such that various components which are optimized in terms of specific functions are produced separately from one another and are interconnected. For example, it is known for a main body of the carrier element, which for transmitting a driving force is coupleable to a traction means of the window lifting device, to be produced from a first material which has a comparatively high strength, such as polyamide, for example. A sliding body is then often push-fitted, in particular clip-fitted, to this main body, said sliding body being produced from a friction-optimized material such as polyoxymethylene (POM for short), for example. The carrier element later bears on the guide rail by way of this sliding body so that the material pairing between the sliding body of the carrier element and the guide rail is decisive for minimizing the friction which arises when the carrier element is displaced along the guide rail. By using a separate sliding body, the carrier element has a friction-optimized portion only in a localized manner, and it is not necessary for the carrier element to have to be produced entirely from the expensive friction-reducing material.

In order for the assembly effort to be reduced it is further known for the carrier element for a window lifting device to be produced by a multicomponent injection-molding method, so as not to produce individual bodies of the carrier element that are provided for dissimilar functions separately from one another and subsequently have to assemble said bodies. In this way, it is known, for example, for a soft component, for example an elastomer, to be molded to a main body of a carrier element, so as to configure in a targeted manner a damping stop in a portion of the carrier element and/or to provide a certain degree of elasticity. For example, the soft component is molded to a region of the main body of the carrier element by way of which the carrier element impacts on a stationary component, so as to pre-define a lowermost or an uppermost adjustment position of the glasses. Furthermore, it is known from WO 2006/024267 A1 for a support body from a soft component to be config- ured in a multicomponent injection-molding method on a guide region of a carrier element by way of which the carrier element is mounted on a guide rail, so that by way of this support body—which in comparison with the contiguous material is more elastic—the position of the window glass which is connected to the carrier element may be more easily adapted to the guide rail, so as to compensate for tolerances.

In the case of the production methods for such a carrier element that have hitherto been implemented in practice, various bodies which in term of the geometry thereof and the material used are adapted to their respective function are molded in the multicomponent injection-molding method in a classic hard-to-soft sequence. In other words, herein always the material melting at a higher temperature, poly-amide for example, is processed first, and subsequently a material melting at a lower temperature, POM for example, or a soft component, is processed.

In this way, it is described by way of example also in DE 102 07 140 B4 that a sliding body from a material having good sliding properties is molded to a main body of a carrier element from a material of relatively high strength.

In an analogous manner, DE 100 27 877 A1 describes the production of a carrier element of dissimilar materials according to the insertion technique, wherein a main body and a mount for connecting to a window glass are molded to at least one prefabricated connection element, so that the mount by way of the at least one connection element is repositionable in relation to the main body.

The previously known production processes may have the disadvantage that the adhesion of the material melting at a lower temperature is not at an optimum and, by way of so-called interlinking features or rearward-engaging features it has to be ensured that the two sequentially molded bodies are interconnected with adequate strength.

Additionally, sealing of the injection-molding die used may be difficult since the dissimilar bodies are usually made from the outside toward the inside. For example, the main body from the material melting at a higher temperature is initially molded, and a body from a material melting at a lower temperature is subsequently molded in the interior of said main body and/or in regions lying inside said main body. In practice, excessive injection often arises here despite sealing edges, or scuffing arises in critical regions, contaminating the injection-molding tool and thus causing the formation of burrs. By virtue of excessive injection which is often smooth, stick-slip effects and thus undesirable noise generation may moreover arise during use of the window lifting device in combination with the glass.

Here too, it has hitherto been hardly possible for material to be saved when a soft component has been used for producing a damper body on a main body of a carrier element. By virtue of long flow paths and of the sublayer which is formed by the (plastics) material of the already molded main body, a reduction in the wall thickness of the soft component is not possible. Excessive injection pressures would arise, in the case of which the formation of burrs significantly increases. Moreover, by way of the necessary modification to the sealing edges the closing-force requirement of the injection-molding plant would be increased, the formation of burrs becoming more probable on account thereof.

SUMMARY

Against this background, the invention is based on the object of further improving a carrier element for a window lifting device and a method for producing the same, and of overcoming or at least reducing the disadvantages mentioned above.

This object is achieved by a method as described herein and by a carrier element as described herein.

According to a first aspect of the invention, for the production of a carrier element which when completed has at least two interconnected bodies which are produced from dissimilar materials having dissimilar melting points by a multicomponent injection-molding method, a body from a material melting at a lower temperature is to mold before a body from a material melting at a higher temperature, and a body from the material melting at a higher temperature (higher-melting material) is to mold to the body from the material melting at the lower temperature (lower-melting material). A type of an "inverted injection-molding method" is thus implemented.

It has been surprisingly demonstrated that the aforementioned disadvantages may be avoided in the case of a production method according to the invention, in which a material melting at a higher temperature is molded for a body of the carrier element to a body from a material melting at a lower temperature. In this way, for example, the adhesion of a soft component to a main body of the carrier element may be implemented without additional linking features, and the carrier element may be produced substantially without burrs even in the region of the soft component. No sealing edges which require a specific closing force are necessary for the injection-molding tool. Also, the construction of the injection-molding tool may be adapted in a simpler manner when, for example, the main body which is molded from a material melting at a higher temperature is molded as a hard component at the end of the injection-molding method and, on account thereof, does not have to be made to fit in the cavity of the injection-molding die for sealing purposes.

All materials which are used for the production of the individual bodies of the integral carrier element are preferably plastics. For example, one body is produced from a material melting at a comparatively low temperature, such as a thermoplastic elastomer, for example. A further body may be produced from polyoxymethylene (POM) melting at a higher temperature, or from polyamide which is preferably glass-fiber reinforced, wherein polyamide in comparison with POM again represents a material melting at a higher temperature.

In one exemplary embodiment, the carrier element has at least
- a main body from a first material, said main body for transmitting a driving force being coupleable to a traction means of the window lifting device;
- a sliding body from a second material, said sliding body being engageable with the guide rail of the window lifting device; and
- a damper body from a third material, said damper body configuring a stop on the carrier element, or representing a decoupling feature in relation to the window glass, and the first, second, and third materials have dissimilar melting points. For example, one of the materials (polyamide, for example) has a melting point above 220° C., for example between approx. 210° C. and 265° C., while the other materials (POM and a thermoplastic elastomer, for example) have a melting point of below 190° C., for example in the range between approx. 165° C. and 190° C., and below 170° C., for example between approx. 80° C. and 170° C.

The use of a soft component in the form of a thermoplastic elastomer is preferred for forming the damper body on which the carrier element in the assembled state of the window lifting device impacts on a stationary component when the end of a predefined adjustment path for the glass to be adjusted has been reached and the glass has been lowered to the maximum, for example. The sliding body is produced from a material having good sliding properties and may be produced from POM. The main body may preferably be produced from glass-fiber reinforced polyamide. For example, polybutylene terephthalate or polyoxymethylene are further materials which are suitable for the main body.

In principle, the main body may be produced in comparison with the material of the sliding body and/or of the damper body from a material which melts at higher temperatures and may be molded to the sliding body and/or to the damper body. In this manner, the damper body is initially molded, for example, and the sliding body is subsequently molded thereto, and the main body is molded to the already molded intermediate product composed of the damper body and the sliding body. Alternatively, the damper body may be initially molded. The main body is then molded to the latter, before the sliding body is in turn molded to the main body.

Alternatively, the sliding body may be initially molded, to which the main body from the material melting at a higher temperature is molded in a next processing step of the multicomponent injection-molding method. Before the main body from the material melting at a higher temperature is molded thereto, the damper body from the material which in comparison to the sliding body and to the main body melts at a lower temperature still may herein optionally be molded to the sliding body. In one alternative embodiment, the damper body is molded to the main body only at the end of the injection-molding method and thus after the main body has been molded to the sliding body.

Independently of the melting temperature of the individual materials, according to one further aspect of the present invention a method is proposed in which the carrier element has at least
- a main body from a first material, said main body for transmitting a driving force being coupleable to the traction means; and
- a sliding body from a second material, said sliding body being engageable with the guide rail; and/or
- a damper body from a third material, said damper body configuring a stop on the carrier element, or representing a decoupling feature in relation to the window glass, and for producing the carrier element by the multicomponent injection-molding method, the sliding body and/or the damper body are/is initially molded before the main body is molded thereto.

In a production method according to the invention and according to the second aspect, a sliding body and/or a damper body which in the conventional manner have hitherto been retrospectively attached as separate components to the already molded main body or have been molded to the main body are therefore molded in a multicomponent injection-molding method before the main body, the main body being only subsequently molded thereto. It has been demonstrated that the production process may be improved and the carrier element may be more easily produced substantially without burrs also on account thereof. Preferably, the main body is also produced here from a material which in comparison to the material of the sliding body and/or of the damper body melts at a higher temperature, so that the advantages and features which have been previously mentioned in conjunction with the first aspect of the invention and which are mentioned in the following can be additionally achieved. This is not mandatory, however.

In one variant of an embodiment, a body from a material melting at a lower temperature is molded in layers before a body from a material melting at a higher temperature. In this way, the soft component is molded in a plurality of preferably thin layers having a thickness of ≤1.5 mm in a first step, for example, before a material melting at a higher temperature for forming a further body of the carrier element is preferably molded to the latter in the same injection-molding die in a second step. In one exemplary embodiment, the layer thicknesses during injection of the material melting at a lower temperature are in the range from 0.3 to 1.0 mm. However, if required, a layer thickness may also be more than 1.0 mm.

In order to avoid displacement of the first molded entrainment-catch portion melting at a lower temperature, or of the corresponding body, respectively, during injection of the material melting at a higher temperature for another body, the first molded body may be sunk. The body is consequently produced in a depression in an injection-molding die such that by injecting the material melting at a higher temperature for the further body into the injection-molding die the already molded body is not displaced within the injection-molding die. By being disposed in the depression there are thus no engagement surfaces for the melt which subsequently flows in. Alternatively or additionally, (other) means may be provided in the injection-molding die and/or in the injection-molding tool in order to counteract any displacement of the body from the material melting at a lower temperature within the injection-molding die. For example, points with erosion roughness and/or retaining webs may be present within the injection-molding die. Furthermore, a sealing effect and thus the formation of burrs may be avoided by way of a recessed conical runout for the first injected material having the lower melting point in the sealing region of the injection-molding die.

In the case of one exemplary embodiment of a production method according to the invention, an injection-molding tool which is capable of variable temperature control is employed in the multicomponent injection-molding method, so as to be able to generate melts of dissimilar (plastics) materials by way of this injection-molding tool and to be able to inject said melts. Herein a cooling phase of the injection-molding tool following the processing of a material melting at a higher temperature may be utilized for processing and injecting a material melting at a lower temperature for the same carrier element, for example.

One further aspect of the present invention is a carrier element for a window lifting device which may be produced according to a method according to the invention and in which
- a body, as a portion of the carrier element, from a material melting at a lower temperature has been molded before a further body of the carrier element from a material melting at a higher temperature, and the body from the material melting at a higher temperature has been molded to the body from the material melting at a lower temperature; and/or
- a main body is molded to a sliding body and/or to a damper body.

Advantages of exemplary embodiments for a method according to the invention that are mentioned above and below thus also apply to a carrier element according to the invention, and vice-versa.

An integral carrier element of this type which however is embodied having a plurality of portions or bodies from dissimilar materials may consequently also have a main body from a first material, said main body for transmitting a driving force being coupleable to a preferably flexible traction means of the window lifting device. Furthermore, the carrier element may have a sliding body from a second material, which is engageable with the guide rail of the window lifting device, and a damper body from a third material, which configures a stop on the carrier element.

BRIEF DESCRIPTION OF THE DRAWINGS

Further advantages and features of the invention will moreover become evident from the following description of exemplary embodiments by means of the figures.

FIGS. 2-5 show various potential sequences in the production of the various bodies of the carrier element of FIGS. 1A, 1B, and 1C, in which in each case at least one body from a material melting at a lower temperature is molded before a body from a material melting at a higher temperature.

FIG. 6 shows a completed carrier element in a perspective view.

FIG. 7A shows in a perspective view the carrier element of FIG. 6, having the main body and the damper body, but without the sliding body, as an intermediate product in the context of an exemplary embodiment of a production method according to the invention.

FIG. 7B shows in a perspective view a damper body and a sliding body as an alternative intermediate product in the context of another exemplary embodiment of a production method according to the invention.

FIG. 7C shows in a perspective view a sliding body having a main body molded thereto, but without a damper body, as a further alternative intermediate product for a further variant of an embodiment of a production method according to the invention.

DETAILED DESCRIPTION

Figure 8B:
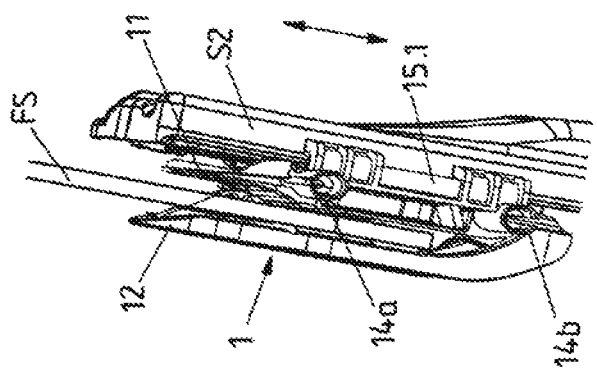
FIG. 8B shows in an enlarged scale one of the carrier elements of FIG. 8A, having the window glass connected thereto.
Figure 8A:
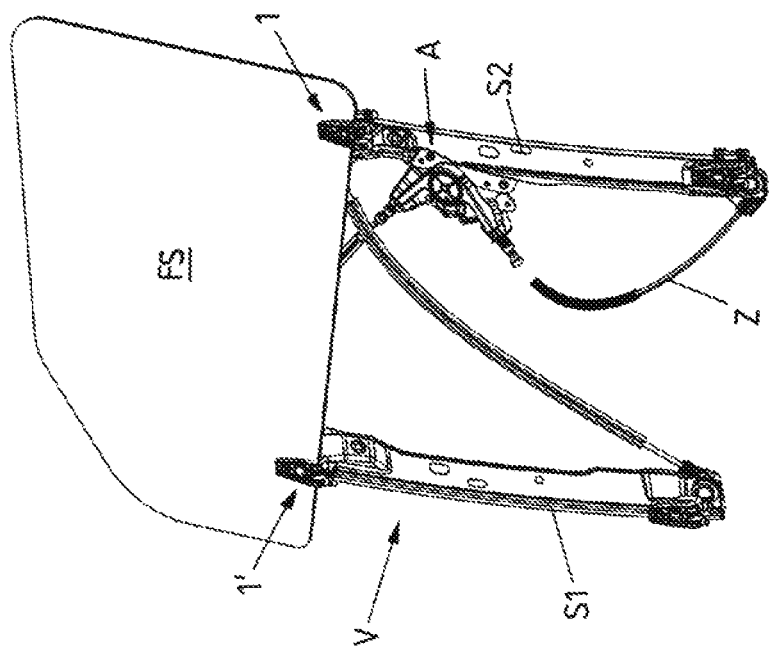
FIG. 8A shows a window lifting device in a side view, having two carrier elements, produced according to the invention, for adjusting a vehicle window glass.

FIGS. 8A and 8B initially illustrate a window lifting device V in the form of a double-stranded motor-vehicle window lifting assembly, by means of which a window glass FS may be adjusted and may be lowered and raised within a vehicle door, for example. The window glass FS in the region of the lower glass edge thereof is connected to two carrier elements 1' and 1 which are mutually spaced apart in a transverse direction. These carrier elements 1 and 1' are in each case displaceably mounted on a guide rail S1 or S2, and are connected to a traction means in the form of a Bowden cable Z. The Bowden cable Z is furthermore connected to an electromotive drive A such that the two carrier elements 1 and 1' upon activation of the drive A are displaced along the guide rails S1 and S2 thereof, which presently run so as to be substantially parallel with one another, so as to lower or lift the window glass FS.

The one carrier element 1 is shown in a larger scale in FIG. 8B. This carrier element is configured in an identical manner to the carrier element 1' of FIG. 8A, so that the features of the carrier element 1 that are described hereunder also apply to the carrier element 1'.

The carrier element 1 has two mutually opposite legs 11 and 12, the lower edge of the window glass FS being introduced there between and a portion of the window glass FS on the lower glass edge thereof being held there between. The window glass FS is thus fixed to the carrier element 1 and is adjustable by displacing the carrier element 1 along the guide rail S2 thereof assigned thereto. For the connection of the Bowden cable Z to the carrier element 1, the carrier element 1 on a main body 10 has two nipple chambers 14a and 14b in which in each case one cable nipple of the Bowden cable Z is received in a form-fitting manner, so as to transmit a driving force to the carrier element 1. A guide portion 15, of which only a part-region 15.1 is visible in FIG. 8B, is furthermore provided for the displaceable mounting on the guide rail S2. Two encompassing lugs by way of which the carrier element 1 is engaged with the guide rail S2 and which in the assembled state for the intended use encompass a peripheral portion of the guide rail S2 are configured on this part-region 15.1. The carrier element 1 by way of the guide portion 15 is clip-fitted to the guide rail S2 or is pushed onto the end of the latter.

Figure 1C:
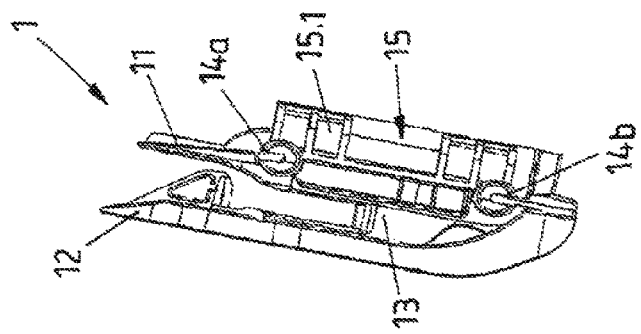
FIGS. 1A-1C show in various views an exemplary embodiment for a carrier element according to the invention which has been molded from three dissimilar materials according to a method according to the invention.
Figure 1B:
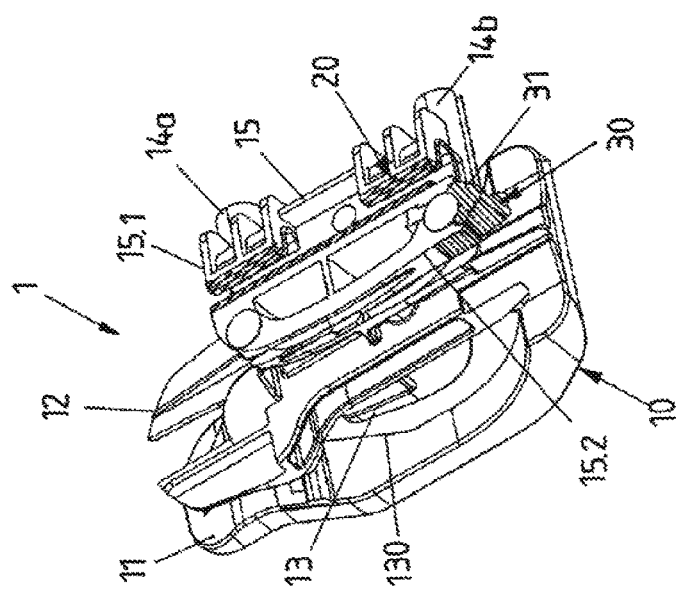
Figure 1A:
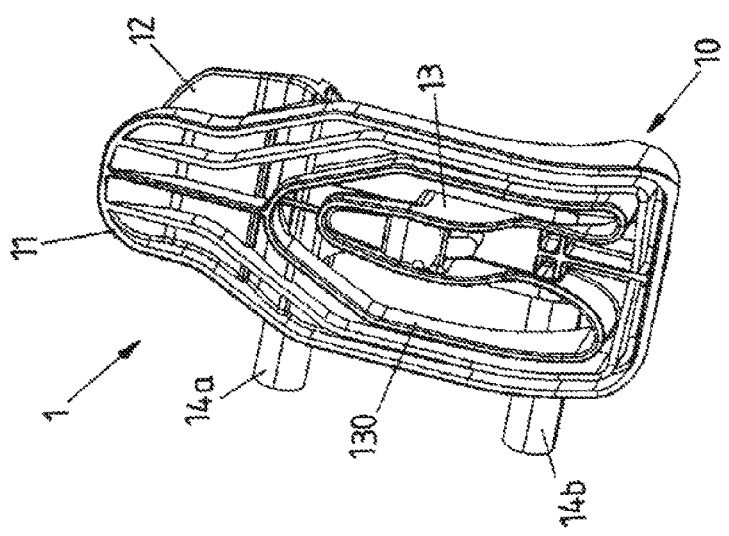

As can be seen by means of the individual illustrations of the carrier element 1 in FIGS. 1A, 1B, and 1C, the carrier element 1 for the various functions to be fulfilled by the former has various portions or bodies 10, 20, and 30, which are produced from dissimilar materials.

The two legs 11, 12, a bearing portion 13 on which the lower edge of the window glass FS is to bear, the two nipple chambers 14a and 14b, and the guide portion 15 are configured on a main body 10 from a comparatively rigid material, for example glass-fiber reinforced polyamide. Consequently, the Bowden cable Z engages directly on the main body 10, so as to transmit a driving force to the carrier element 1. In order to save material and to provide a certain degree of flexibility for the compensation of tolerances, a clearance in the form of a free punch 130 is configured on the one leg 11 of the main body 10, the bearing portion 13 for the lower glass edge extending in a tongue-shaped manner in said clearance.

In order to be able to displace the carrier element 1 along the guide rail S2 in manner that is as friction-free as possible, a sliding body 20 is configured from a material that is optimized to this end, for example from POM. This sliding body 20 is connected to the guide portion 15 of the main body 10 and is embodied such that the carrier element 1 bears on the guide rail S2 only by way of the sliding body 20. The sliding body 20 herein forms the internal walls of a guide which is configured between two part-regions 15.1 and 15.2 of the guide portion 15, a portion of the guide rail S2 being received therein in a form-fitting manner. While the L-shaped encompassing lugs which are provided with the sliding body 20 are configured on the one part-region 15.1 of the guide portion 15, parts of a damper body 30 of the carrier element 1 are configured on the other part-region 15.2 along which the rope of the Bowden cable Z is also guided.

The damper body 30 presently is composed of a soft component, for example of a thermoplastic elastomer, and thus of a (third) material which is dissimilar to the material of the main body 10 and to the material of the sliding body 20. A support of the window glass FS which is as soft and elastic as possible within the carrier element 1 is to be enabled on a support portion 32 of the damper body 30 (cf. FIGS. 2 to 5, for example) by way of the damper body 30, on the one hand. Moreover, a stop portion 31 of the damper body 3 that downwardly projects on the part-region 15.2 configures that portion of the carrier element 1 that at the end of a predefined adjustment path for the window glass FS impacts on a stationary vehicle component. By way of the damper body 30, and in particular by way of the stop portion 31 thereof, stopping of the carrier element 1 at the end of an adjustment path for the window glass FS is thus to be damped, in particular in order to avoid damage and undesirable noise generation.

The carrier element 1 having the various bodies 10, 20 and 30 thereof, which are composed of dissimilar materials having dissimilar melting points, is integrally embodied, that is to say is not composed of mutually separate components which are retrospectively assembled. Rather, the individual bodies 10, 20 and 30 are produced by a multicomponent injection-molding method, at the end of which the individual bodies 10, 20, and 30 form inseparable integrated portions of the integral carrier element 1.

In order to herein reduce the investment in materials and to improve the precision in the production of the carrier element 1, initially at least one of the three bodies 10, 20, and 30 of the carrier element 1, that is composed of a material with a material which in comparison with another body 30, 20, or 10, melts at a lower temperature is molded, and subsequently at least one body from a material melting at a higher temperature is molded to this body. Consequently, a body from a material having a lower melting point is initially produced by the injection-molding method, and the material having a higher melting point is subsequently infed in one of the further production steps, so as to configure a further body of the carrier element 1. It may be achieved on account thereof, for example, that the previously injected material is again fused at least in a localized manner and thus connects better to the subsequently injected material. It has moreover been demonstrated that in particular the material melting at a lower temperature may be produced in particularly thin layers and the formation of burrs may easily be avoided, since the material melting at a lower temperature is embedded in the material melting at a higher temperature, which has been subsequently injected.

Various variants of embodiments for the production of a carrier element 1, in which in each case at least one body from a material melting at a higher temperature is molded to an already previously molded body from a material melting at a lower temperature are visualized by way of FIGS. 2, 3, 4, and 5.

For example, in the variant of the embodiment of FIG. 2 the sliding body 20 from POM is initially molded in an injection-molding die. This sliding body 20, configured in an elongate manner, herein has a base 21 on which two sliding-guide regions 22a and 22b project in an L-shaped, C-shaped, or S-shaped manner. The guide rail S2 is later encompassed by the carrier element 1 on these sliding-guide regions 22a and 22b which after completion of the carrier element 1 form the internal sides of the encompassing lugs of the part-region 15.2. The base 21 and the sliding-guide regions 22a and 22b in the case of the completed carrier element 1 are thus embedded between the part-regions 15.1 and 15.2 within the guide portion 15. In the case of the method outlined in FIG. 2, the damper body 30 which in comparison with the material of the sliding body 20 is composed of a material melting at an even lower temperature, for example of a thermoplastic elastomer, is molded subsequent to the sliding body 20. Apart from the stop portion 31 which has already been explained above, the damper body 30 has a support portion 32 which in the region of the one leg 12 is intended to provide an elastic support for the glass FS. The main body 10 from the preferably glass-fiber reinforced polyamide melting at a higher temperature is then subsequently molded to the intermediate product which is composed of the already molded sliding body 20 and of the damper body 10, such that both the sliding body 20 as well as the damper body 30 are embedded in the main body 10.

The sliding body 20 is initially molded in the case of the variant of embodiment of FIG. 3. The main body 10 from the preferably glass-fiber reinforced polyamide melting at a higher temperature is subsequently molded to said sliding body 20. Subsequently, the damper body is molded to the main body 10 having the sliding body 20 already embedded therein.

In case of the variant of embodiment of FIG. 4, materials of successively higher melting temperatures are processed. In this way, the damper body 30 from that material that in comparison with the other bodies 10 and 20 has the lowest melting point is initially molded. The sliding body 20 which is composed of a material of which the melting point is lower than the melting point of the material for the main body 10 is subsequently molded. The main body 10 is subsequently injected into an injection-molding die and molded to the damper body 30 and to the sliding body 20. Finally, the damper body 30 and the sliding body 20 here are thus insert molded by the material of the main body 10, said material melting at a higher temperature.

In the case of the variant of embodiment of FIG. 5, the damper body 30 from the relatively expensive soft component is again initially molded, and the main body 10 from the material melting at a higher temperature is subsequently molded thereto. In this manner, the damper body 30 is already embedded within the main body 10, and the main body 10 at the relevant points is already coated with the soft component of the damper body 30 before the sliding body 20 is molded to the guide portion 15 of the main body 10.

While the completed carrier element 1 having the main body 10, the sliding body 20, and the damper body 30 is once again illustrated in perspective view in FIG. 6, FIGS. 7A, 7B, and 7C in a likewise perspective view show various intermediate products in the production of the carrier element 1, depending on the exemplary embodiment of a production method according to the invention that has been carried out.

The damper body 30 having the main body 10 which is molded thereto is illustrated in FIG. 7A, corresponding to the production method outlined in FIG. 5. In turn, the already molded damper body 30 and the already molded sliding body 20 are illustrated in FIG. 7B, before the main body 10 is molded thereto, corresponding to the method outlined in FIG. 2 or in FIG. 4. In turn, the main body 10 is already molded to the sliding body 20 in FIG. 7C, corresponding to the exemplary embodiment outlined in FIG. 3. Missing here is only the molding of a soft component to the respective regions of the main body 10, and thus the damper body 30.

In principle, an initially molded body from a material melting at a lower temperature, for example the damper body 30 or the sliding body 20, may be molded in a depression within an injection-molding die during the production, such that no displacement of the previously molded body 20 or 30 arises during the subsequent injection of the melt of the material melting at a higher temperature, for example for the main body 10.

Of course, it is possible that in the context of a production method according to the invention the carrier element 1 is processed in different stations of an injection-molding plant, so as to process the dissimilar material melts. For example, an intermediate product shown in FIG. 7A, 7B, or 7C is produced in a first station, and the respective third body 20, 10, or 30, is molded thereto in a second station.

While a carrier element from at least three different materials and composed of a main body 10, a sliding body 20, and a damper body 30 is illustrated in each case in the figures explained above, it is of course furthermore possible in the context of the invention that the carrier element 1 is produced in a multicomponent injection-molding method from only two materials having dissimilar melting points. As opposed to conventional injection-molding methods, it is only essential here that the carrier element 1 for a vehicle window lifting device V is produced by an inverse injection-molding method in which initially a portion or a body of the carrier element is molded from a material melting at a lower temperature and a portion or body of the carrier element from a material melting at a higher temperature is subsequently molded thereto.

LIST OF REFERENCE SIGNS

1 Carrier element
10 Main body
11, 12 Leg
13 Bearing portion
130 Clearance
14a, 14b Nipple chamber
15 Guide portion
15.1, 15.2 Part-region
20 Sliding body
21 Base
22a, 22b Sliding-guide region
30 Damper body
31 Stop portion
32 Support portion
A Drive
FS Window glass
S1, S2 Guide rail
V Window lifting device
Z Bowden cable (traction means)

The invention claimed is:

1. A method for producing a carrier element for a window lifting device in which adjustment of a glass is performed via a traction means, the carrier element being displaceable along a guide rail of the window lifting device and being connected to the traction means, wherein the completed carrier element has at least two interconnected bodies which are produced from dissimilar materials having dissimilar melting points, and the carrier element having the at least two interconnected bodies is produced by a multicomponent injection-molding method, wherein in the production of the carrier element by the multicomponent injection-molding method a body from a material melting at a lower temperature is molded before a body made from a material melting at a higher temperature, and the body made from the material melting at a higher temperature is molded to the body made from the material melting at a lower temperature,
wherein the carrier element has at least:
a main body made from a first material, said main body for transmitting a driving force being coupleable to the traction means;
a sliding body made from a second material, said sliding body being engageable with the guide rail; and a damper body made from a third material, said damper body configuring a stop on the carrier element, and wherein the first, second, and third materials have dissimilar melting points.

2. A method for producing a carrier element for a window lifting device in which adjustment of a glass is performed via a traction means, the carrier element being displaceable along a guide rail of the window lifting device and being connected to the traction means, wherein the completed carrier element has at least two interconnected bodies which are produced from dissimilar materials, and the carrier element having the at least two bodies is produced by a multicomponent injection-molding method, wherein the carrier element has at least a main body made from a first material, said main body for transmitting a driving force being coupleable to the traction means; and a sliding body made from a second material, said sliding body being engageable with the guide rail; and a damper body made from a third material, said damper body configuring a stop on the carrier element, wherein for producing the carrier element by the multicomponent injection-molding method, the sliding body and the damper body are initially molded before the main body is molded thereto.

3. The method as claimed in claim 2, wherein the main body in comparison with the material of the sliding body is produced from a material melting at a higher temperature and is molded to the sliding body and to the damper body.

4. The method as claimed in claim 3, wherein the damper body in comparison with the material of the sliding body is produced from a material melting at a lower temperature and is molded to the sliding body.

5. The method as claimed in claim 3, wherein the damper body is initially produced from a material that in comparison with the material of the main body melts at a lower temperature, the main body is then molded to the damper body, and the sliding body made from a material that in comparison with the material of the damper body melts at a higher temperature and in comparison with the material of the main body melts at a lower temperature is subsequently molded to the main body.

6. The method as claimed in claim 3, wherein the damper body in comparison with the material of the main body is produced from a material melting at a lower temperature and is molded to the sliding body.

7. The method as claimed in claim 2, wherein the sliding body in comparison with the material of the damper body is produced from a material that melts at a higher temperature and is molded to the damper body before the main body is molded to the damper body and to the sliding body.

8. The method as claimed in claim 2, wherein a body from a material melting at a lower temperature is molded in layers before a body made from a material melting at a higher temperature.

9. The method as claimed in claim 2, wherein a body from a material melting at a lower temperature is produced in a depression in an injection-molding die such that by injecting the material melting at a higher temperature for the further body into the injection-molding die the already molded body is not displaced within the injection-molding die.

10. The method as claimed in claim 2, wherein an injection-molding tool which is capable of variable temperature control is employed in the multicomponent injection-molding method, so as to be able to generate melts of dissimilar materials in this injection-molding tool and to be able to inject said melts.

11. The method as claimed in claim 2, wherein the main body in comparison with the material of the damper body is produced from a material melting at a higher temperature and is molded to the sliding body and to the damper body.

* * * * *